(12) United States Patent  
Mountain

(10) Patent No.: US 9,521,369 B2  
(45) Date of Patent: Dec. 13, 2016

(54) CONTROLLING ACCESS TO BROADCAST PROGRAMMING

(75) Inventor: Dale Llewelyn Mountain, West Yorkshire (GB)

(73) Assignee: EchoStar UK Holdings Ltd., Steeton (GB)

( * ) Notice: Subject to any disclaimer, the term of this patent is extended or adjusted under 35 U.S.C. 154(b) by 1124 days.

(21) Appl. No.: 12/344,049

(22) Filed: Dec. 24, 2008

(65) Prior Publication Data

US 2010/0162290 A1    Jun. 24, 2010

(51) Int. Cl.
| | |
|---|---|
| H04N 21/232 | (2011.01) |
| H04N 21/25 | (2011.01) |
| H04N 21/254 | (2011.01) |
| H04N 21/2543 | (2011.01) |
| H04N 21/65 | (2011.01) |
| H04N 7/16 | (2011.01) |
| H04N 21/432 | (2011.01) |
| H04N 21/4627 | (2011.01) |
| H04N 21/6547 | (2011.01) |
| G06Q 40/00 | (2012.01) |

(52) U.S. Cl.
CPC .............. *H04N 7/165* (2013.01); *G06Q 40/12* (2013.12); *H04N 21/4325* (2013.01); *H04N 21/4627* (2013.01); *H04N 21/6547* (2013.01)

(58) Field of Classification Search
None
See application file for complete search history.

(56) References Cited

U.S. PATENT DOCUMENTS

| | | | | |
|---|---|---|---|---|
| 5,796,828 A | * | 8/1998 | Tsukamoto | G11B 20/00086 |
| | | | | 348/E5.004 |
| 2002/0069419 A1 | * | 6/2002 | Raverdy | G07F 17/3223 |
| | | | | 725/87 |
| 2006/0257102 A1 | * | 11/2006 | Park | G11B 20/00173 |
| | | | | 386/259 |

* cited by examiner

*Primary Examiner* — Brian T Pendleton
*Assistant Examiner* — Jean D Saint Cyr
(74) *Attorney, Agent, or Firm* — LK Global

(57) ABSTRACT

A set top box for a television receiver has a paired viewing card. It is also coupled to a hard disc drive for the recording and storage of received broadcasting. If the viewer has a full subscription, the viewer is able to access and view subscription broadcasting by way of the set top box. If the subscription is no longer paid, different usage rights are associated with the set top box so that, while the set top box can no longer access the subscription broadcasting, the viewer is still able to access and play any previously stored subscription programming.

10 Claims, 2 Drawing Sheets

CONTROLLING ACCESS TO BROADCAST PROGRAMMING

The present invention relates to a method and system for controlling access to broadcast programming by way of local receiving device.

BACKGROUND TO THE INVENTION

Television receivers are controlled by digital devices, often referred to as set top boxes (STBs), which receive and process transmissions from broadcasters. The user has a control device, often a remote control device, to control the set top box, and hence the television receiver. Together these elements provide a system for receiving and accessing broadcast programming.

With a set top box, it is common to provide a smart card, known as a viewing card, which is issued to an authorised user of various services. The smart card has to be inserted into the set top box to enable access to some, or all of the programming. For example, the smart card may be required to enable access to services only available by subscription, and/or to pay per view individual programs. A processing unit in the set top box will read information from the viewing card to enable access to services. The viewing card may, for example, identify a subscriber account, and if the appropriate payments have been made to that subscriber account, access is enabled. Generally, subscription payments have to be made monthly.

It is also known to pair the viewing card with a particular set top box. Thus, on installation of a set top box at the home of an authorised subscriber, details from the subscriber's viewing card are stored in the set top box. Thereafter, the set top box will only allow the television receiver to access some, or all, programming if the paired viewing card is in place in the set top box.

It is also known to provide within the set top box, or separately, a hard disc drive on which received broadcast programming can be recorded and stored for later viewing.

SUMMARY OF THE INVENTION

It has now been appreciated that a user may build up a library of recordings on hard disc drives over a period of time. Commonly, if the user stops paying the subscription, the set top box will prevent the system from accessing the stored content.

It has now been recognized that this common manner of operation provides a problem in that legally acquired content which has been recorded and stored by a user may become unavailable for use in the future by the user.

The present invention seeks to provide a solution to this problem.

According to a first aspect of the present invention there is provided a method of controlling access to broadcast programming by way of a local receiving device, the method comprising associating usage rights with the receiving device, and enabling the receiving device to operate in one of at least two different operating modes in dependence upon the usage rights associated therewith, wherein, in a first operating mode, the receiving device is enabled to receive and access broadcast programming, whilst in a second operating mode the receiving device is unable to receive and access the broadcast programming but is able to access programming which has been stored locally.

With embodiments of the invention, the receiving device, for example, incorporating a set top box, is enabled to operate in at least two different modes. Thus, even though the receiving device is not able to receive and access broadcast programming, for example, because the subscription therefor has ended, the receiving device is able to access programming which has been stored locally, for example, on hard disc drives.

In an embodiment, the method further comprises transmitting the associated usage rights to the receiving device, and storing the associated usage rights.

It is the broadcaster who generally controls the usage rights, and the broadcaster will provide appropriate control signals representative of the usage rights which it transmits to the receiving device.

Preferably, the method comprises storing the associated usage rights on an integrated circuit card insertable into the receiving device.

The integrated circuit card may be a viewing card, and, for example, may be one of a smart card, a smart chip, or a chip card.

In a preferred embodiment, where the broadcast programming is only available by the payment of periodic subscriptions, when the associated usage rights reveal that current subscription payments have been made, the receiving device is enabled to operate in the first mode and to access the broadcast subscription programming, and when no current subscription payments have been made, the receiving device is enabled to operate in the second mode in which it has no access to the current subscription programming, but is enabled to access previously broadcast subscription programming which has been stored locally.

Embodiments of the invention enable the receiving device to have full access to broadcast subscription programming whilst subscription payments continue to be made. These access rights include the right to record the accessed programming, for example, on hard disc drives. However, if the user stops ends the subscription, for example, by no longer paying the fees, the receiving device is enabled to operate in the second mode. In this mode, the viewer has no access to the current subscription broadcasts, but is enabled to access and play previously recorded subscription programming. Thus, any library of recordings built up by the user remains available for his use.

In an embodiment, the method further comprises associating or pairing the integrated circuit card with the receiving device.

If the integrated circuit card, for example the viewing card, is associated with or paired to the receiving device, this ensures that the second mode operating rights are not available on an alternative receiving device. Thus, whilst the user retains the right to play prerecorded subscription programming, there is no right to access and play that material on other receiving devices.

The invention also extends to a system for receiving and accessing broadcast programming, the system comprising a receiving device for receiving the broadcast programming, and an access circuit for storing usage rights to be associated with the receiving device and for controlling the operating mode of the receiving device in dependence upon the stored usage rights, wherein, in a first operating mode, the receiving device is enabled to receive and access broadcast programming, whilst in a second operating mode the receiving device is unable to receive and access the broadcast programming but is able to access programming which has been stored locally.

According to a further aspect of the present invention, there is provided a system for receiving and accessing broadcast programming, the system comprising receiving means for receiving the broadcast programming, and access means for storing usage rights to be associated with the receiving means and for controlling the operating mode of the receiving means in dependence upon the stored usage rights, wherein, in a first operating mode, the receiving means is enabled to receive and access broadcast programming, whilst in a second operating mode the receiving means is unable to receive and access the broadcast programming but is able to access programming which has been stored locally.

In an embodiment, the access means or the access circuit comprises a processor and storage means and is arranged to store usage rights received by way of broadcast transmissions.

For example, said access circuit comprises a viewing card in the form of an integrated circuit card, and the receiving device incorporates a card reading slot.

The integrated circuit card is preferably one of a smart card, a smart chip, and a chip card.

Preferably, the integrated circuit card is paired to a specified receiving device.

In an embodiment, the system further comprises a display for presenting broadcast programming accessed by the receiving device, and memory for storing broadcast programming accessed by the receiving device.

In a preferred embodiment, the memory is provided by at least one hard disc drive in communication with the receiving device.

The viewing card is preferably paired to a specified receiving device to ensure that only subscription programming which has been stored by the specified receiving device can be later accessed and played by that same receiving device. Pairing of the viewing card with a specified receiving device ensures that the content which has been stored cannot be disseminated to other receiving devices.

In an embodiment, the receiving device comprises a television receiver with a set top box.

It will be well understood that what is known as a set top box is a digital device which may be built in or integrated into a television receiver or may be provided as, or within, a separate device. The present invention comprehends all digital devices for giving a TV receiver functionality whether they are provided separately, in combination with other control circuits and devices, and/or whether they are integrated within the television receiver.

BRIEF DESCRIPTION OF THE DRAWINGS

Preferred embodiments of the present invention will hereinafter be described, by way of example, with reference to the accompanying drawings in which.

DESCRIPTION OF PREFERRED EMBODIMENTS

This invention arose from a consideration of the control of access to the programming received by a set top box for a television receiver and is described further below specifically with reference to that context. However, the invention is also applicable to the access of programming received by electronic devices other than set top boxes for television receivers. For example, the invention is applicable to the control of access to programming received by an audio player, a computer, or other electronic device.

Throughout the specification we refer to a set top box for a television receiver. However, it will be understood that the set top box comprehends any digital device able to impart functionality to the television receiver whether provided in a stand-alone box, incorporated in a stand-alone box along with other devices, or integrated within the television receiver.

Similarly, the references to broadcast programming comprehend transmissions broadcast terrestrially, by satellite and/or by cable. Programming broadcast by way of the internet and in other ways is also included.

Conveniently, the set top box is controlled by a remote control device communicating with the set top box by wireless means. It will be appreciated that any appropriate transmission method to enable the remote control device to communicate with the set top box may be employed. For example, whilst the remote control device is usually remote from the set top box, the remote control device may alternatively be wired to the device it commands.

Figure 1:
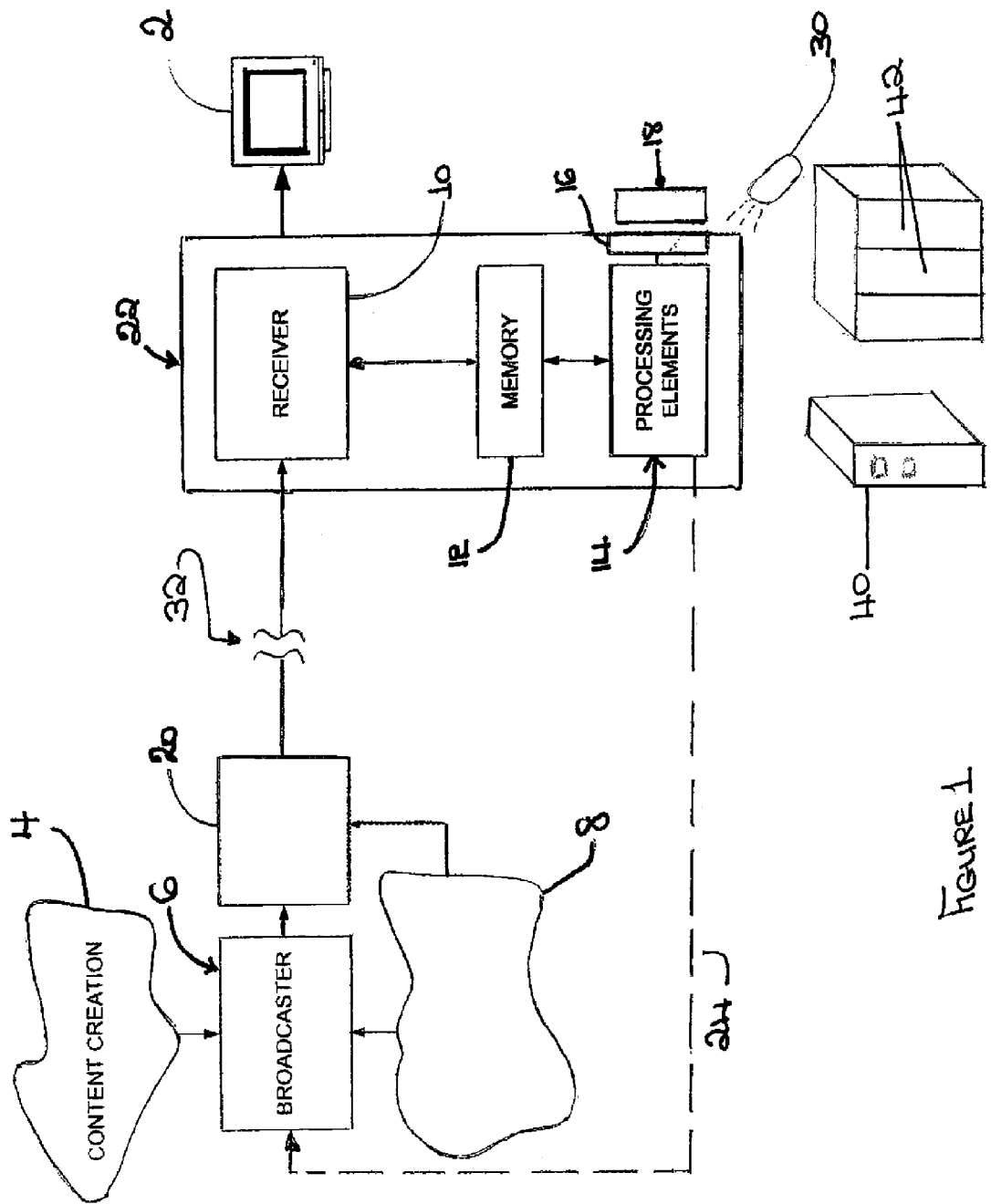
FIG. 1 shows schematically the provision of programming by way of a set top box to a display on a television set.

FIG. 1 shows schematically the provision of programming by way of a set top box 22 to a television receiver 2. Programming content, that is video and audio data, is created as indicated at 4 and is provided to a network provider or broadcaster 6 for transmission. The video and audio content 4 is combined for transmission with information and control data 8. This information and control data 8 may include teletext information, and other material, including data, such as graphics, for display. The information and control data 8 also incorporates data to command and control operation of the set top box 22 and the TV receiver 2. For example, the control data 8 may require the set top box to interrogate a viewing card to check authorisations.

The information and control data may be supplied to the broadcaster 6 for combination with the programming content 4 or it may be fed separately to a multiplexer 20 which is arranged to packetise and multiplex the programming content and the information and control data into a transport stream in accordance with the appropriate standards. It is this material which is then transmitted, as indicated at 32, by any appropriate means to a set top box 22. As is well known, the set top box includes a receiver 10 for receiving the transmitted programming, a memory 12 and a processing unit 14. The processing unit has a card reader 16 into which a viewing card 18 can be inserted. Operation of the set top box 22 is controlled by a remote control device 30 which is in communication with the processing unit 14 of the set top box 22 by way, for example, of infrared communication.

The set top box 22 may also be arranged to communicate with the broadcaster 6. For example, and as suggested, there may be a telephonic connection 24 between the processing unit 14 and the broadcaster 6. This communication between the set top box 22 and the broadcaster 6 can be two-way to enable, for example, the set top box to obtain from the broadcaster information and control data 8 indicating whether or not the subscriber's account identified on the viewing card 18 is up to date.

In many current systems, the viewing card 18 identifies a subscriber account. If, on operation of the remote control device 30 to access programming, the set top box 22 determines by way of its processing unit 14 that the subscriber account has had appropriate payments made such that the programming can be accessed, it will cause the requested programming to be displayed on the television receiver 2. It is possible to store the permissions associated with the subscriber account in the memory 12 of the set top box and/or to pair the viewing card 18 with the set top box. In this latter case, the set top box 22 can only provide programming to the receiver 2 when the paired viewing card 18 is in place.

The viewing card 18 is usually an integrated circuit card and may be provided by a smart card, a smart chip, a chip card, or other appropriate device. In known manner the card reader 16 includes a card reading slot.

In the embodiment illustrated, the set top box 22 is in communication with a hard disc drive 40. In normal use of the system for accessing programming only available upon subscription, the set top box 22, by way of its processing unit 14, is enabled to direct any programming received to the hard disc drive 40 for recording and storage. Recording of the programming by the disc drive 40 may occur contemporaneously with the viewing of that programming on the television receiver 2. Alternatively, the user may record the programs without viewing them, and then view the recorded material at a later date.

The user may choose not to delete recorded material once it has been viewed and may build up a library of broadcast content on the hard disc drive 40 and/or on other hard disc drives 42 provided.

As set out above, to enable subscription programming to be received and accessed, the necessary permissions need to be available and the viewing card 18 needs to be in place. These permissions can be withdrawn by the broadcaster 6 if the necessary subscription payments, generally due monthly, are not paid.

It will be seen that access to the content on the hard disc drives 40 and 42 is by way of the set top box 22 and commonly, if the subscription is terminated the user is not allowed to access current programming from the broadcaster 6. Furthermore, the user may also be denied access to the stored content on the hard disc drives 40 and 42.

Figure 2:
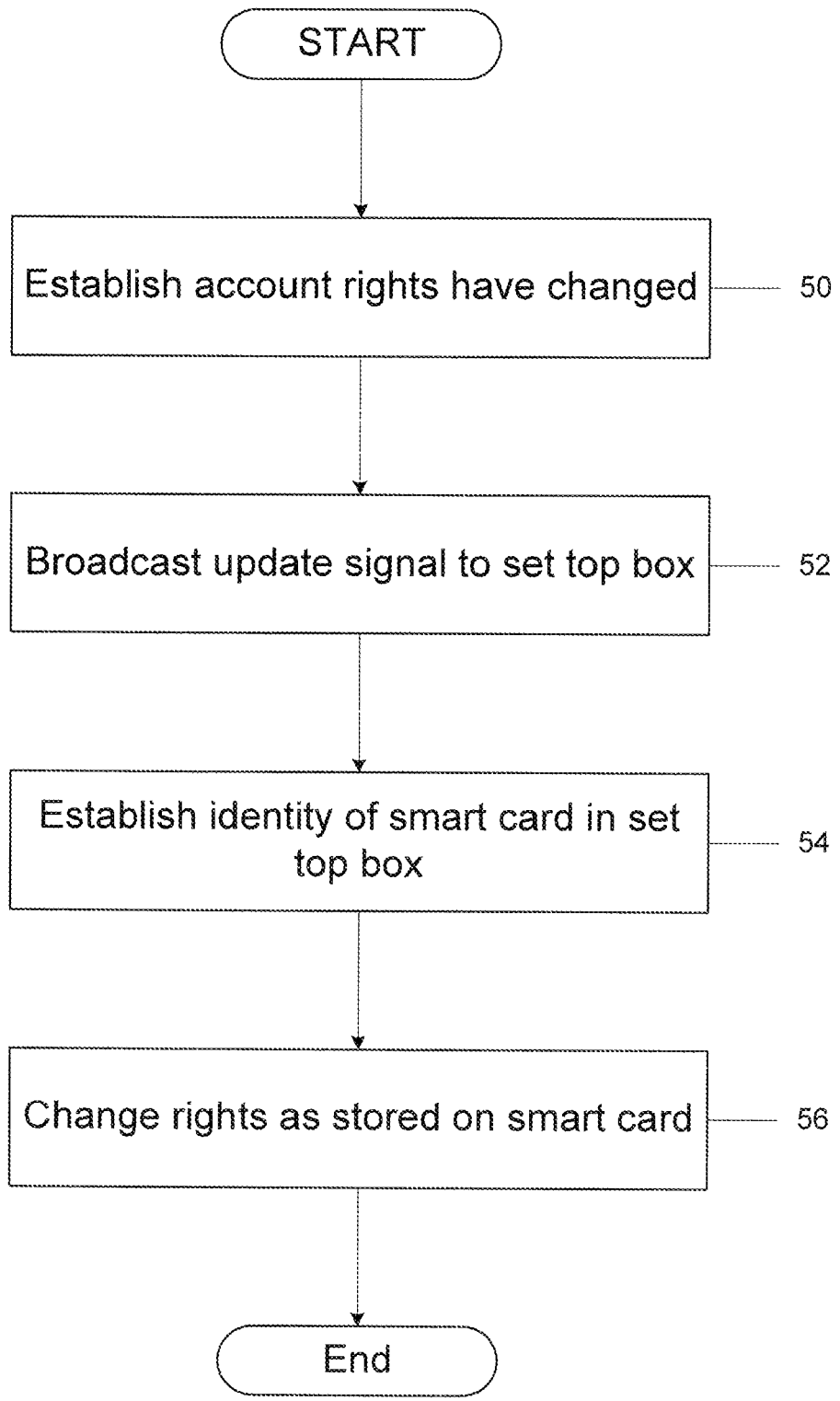
FIG. 2 is a flow chart showing how usage rights of a set top box are changed.

We have seen that the first operating mode of the set top box 22 provides full access to subscription programming and that this requires that a subscription be maintained, for example, by monthly payments. FIG. 2 indicates how the usage rights can be changed to a second set of rights, distinct from the full access rights. Thus, and as shown in FIG. 2, on initialization, for example, when a viewer switches on the set top box 22 or tries to access a function of it, it is established at step 50 that the account rights have changed, for example, that the subscription payments are no longer up to date. The information and control data 8 is arranged to provide an update signal which is broadcast to the set top box 22 at step 52. The update control data received is processed by way of the processing unit 14 which is controlled to establish that the correct viewing card 18 is in the set top box 22. This occurs at step 54. If it is the paired viewing card which is in the set top box 22, the usage rights carried by the viewing card 18 are changed as shown at step 56 to reflect the changed circumstances. Where the change is to there being no subscription in place, the set top box 22 is able to retrieve and play any subscription broadcasting which has been stored on the hard disc drives 40 and 42. However, whilst the set top box 22 may receive free to air programming, it is denied access to the subscription broadcasting.

Of course, it will be appreciated that as the viewing card 18 has to be paired to the set top box 22, access to the content of the hard drives 40 and 42 is not available to a different set top box 22, nor to the set top box 22 originally connected to the hard disc drives 40, 42 when a different viewing card 18 is in place.

Thus, it will be appreciated that the invention enables the provision of two operating modes by the set top box 22 depending upon whether the full subscription has been paid, or not. It will be appreciated that there may be other circumstances which can give rise to further operating modes, and that the same system can provide such differential operating modes. In particular, the system can be used to provide usage rights for the set top box to enable it to access a pay per view broadcast. Those rights may incorporate a right to record the broadcast. Once the broadcast has finished, a right to view a recorded version of the program can be given, and this might be for a finite time or for a finite number of viewings.

It will be appreciated that further variations to and modifications of the embodiments as described and illustrated may be made within the scope of this application as defined by the accompanying claims.

The invention claimed is:

1. A method of controlling access to broadcast programming by way of a local receiving device, wherein the local receiving device is arranged to receive broadcast programming, and to store broadcast programming,
   the method comprising associating usage rights with the receiving device, wherein the associated usage rights are stored on an integrated circuit card, and wherein the receiving device incorporates a card reading slot for receiving and reading the integrated circuit card; and enabling the receiving device to determine locally one of at least two different operating modes in which it is to operate in dependence upon the usage rights associated therewith,
   the method comprising establishing that a required subscription has been maintained, and if so, associating usage rights so that the local receiving device is operated in a first operating mode, in which the receiving device is enabled to receive and store any broadcast programming received, and to access stored programming, wherein in the first operating mode the local receiving device is also enabled to receive broadcast programming and provide the broadcast programming to a presentation device for presentation,
   the method further comprising, if it is established that no current subscription payments have been made changing the usage rights such that the local receiver is changed to be operated in a second operating mode in which the local receiving device is denied access to the broadcast programming and so is unable to receive the broadcast programming, and unable to provide the broadcast programming to a presentation device for presentation, but in the second operating mode the receiving device remains able to access any broadcast programming which has been previously stored locally.

2. A method of controlling access to broadcast programming according to claim 1, further comprising transmitting the associated usage rights to the receiving device, and storing the associated usage rights.

3. A method of controlling access to broadcast programming according to claim 1, wherein the broadcast programming is only available by the payment of periodic subscriptions, and wherein, when the associated usage rights reveal that current subscription payments have been made, the receiving device is enabled to operate in the first operating mode and access the broadcast subscription programming and wherein, when no current subscription payments have been made, the receiving device is changed to operate in the second operating mode and is denied access to the current subscription programming, but is enabled to access previously broadcast subscription programming which has been stored locally.

4. A method of controlling access to broadcast programming according to claim 1, further comprising associating or pairing the integrated circuit card with the receiving device.

5. A system for receiving and accessing broadcast programming, the system comprising a local receiving device for receiving the broadcast programming, the receiving device comprising memory for storing broadcast programming accessed by the receiving device, a presentation device for receiving and presenting broadcast programming from the local receiving device, and an access circuit for storing usage rights to be associated with the receiving device and for determining locally the operating mode of the receiving device in dependence upon the stored usage rights and controlling the receiving device to operate in the determined operating mode, wherein, if it is established that a required subscription has been maintained, associating usage rights with the local receiving device so that it is operated in a first operating mode in which the local receiving device is enabled to receive and store any broadcast programming received, and to access stored programming, and wherein in the first operating mode the local receiving device is also enabled to receive broadcast programming and provide the broadcast programming to the presentation device for presentation, wherein if it is established that no current subscription payments have been made changing the usage rights so that the operating mode of the local receiver is changed to a second operating mode in which the local receiving device is denied access to the broadcast programming and so is unable to receive the broadcast programming, and unable to provide the broadcast programming to the presentation device for presentation, but in the second operating mode the receiving device remains able to access programming which has been previously stored locally, wherein the access circuit comprises an integrated circuit card on which the usage rights are stored, and wherein the receiving device incorporates a card reading slot for receiving and reading the integrated circuit card.

6. A system for receiving and accessing broadcast programming according to claim 5, wherein the integrated circuit card carries a processor and storage means, and wherein usage rights received by way of broadcast transmissions are stored in the storage means.

7. A system for receiving and accessing broadcast programming according to claim 5 wherein the integrated circuit card is one of: a smart card, a smart chip, a chip card.

8. A system for receiving and accessing broadcast programming according to claim 5, wherein the integrated circuit card is paired to a specified receiving device.

9. A system for receiving and accessing broadcast programming according to claim 5, further comprising a display for presenting broadcast programming accessed by the receiving device, and memory for storing broadcast programming accessed by the receiving device.

10. A system for receiving and accessing broadcast programming according to claim 9, wherein the memory is provided by at least one hard disc drive in communication with the receiving device.

* * * * *